(12) United States Patent
Komeyama et al.

(10) Patent No.: US 8,590,433 B2
(45) Date of Patent: Nov. 26, 2013

(54) TORQUE LIMITER

(75) Inventors: Nobuo Komeyama, Nara (JP); Akihide Nagayama, Kashiba (JP)

(73) Assignee: Jtekt Corporation, Osaka-shi, Osaka (JP)

( * ) Notice: Subject to any disclaimer, the term of this patent is extended or adjusted under 35 U.S.C. 154(b) by 424 days.

(21) Appl. No.: 12/737,048

(22) PCT Filed: Jun. 4, 2009

(86) PCT No.: PCT/JP2009/060269
§ 371 (c)(1),
(2), (4) Date: Dec. 3, 2010

(87) PCT Pub. No.: WO2009/148127
PCT Pub. Date: Dec. 10, 2009

(65) Prior Publication Data
US 2011/0100169 A1  May 5, 2011

(30) Foreign Application Priority Data
Jun. 4, 2008 (JP) ................................ P2008-146813

(51) Int. Cl.
*B25B 23/14* (2006.01)

(52) U.S. Cl.
USPC .................... 81/467; 464/32; 81/476

(58) Field of Classification Search
USPC ........ 81/467, 472, 473, 476; 192/56.3; 403/2, 403/5, 31; 464/30, 32
See application file for complete search history.

(56) References Cited

U.S. PATENT DOCUMENTS

| | | | |
|---|---|---|---|
| 4,752,275 A | 6/1988 | Lindenthal et al. | |
| 5,051,018 A * | 9/1991 | Appell et al. | 403/5 |
| 6,659,678 B2 * | 12/2003 | Takahashi et al. | 403/31 |
| 2009/0173591 A1 | 7/2009 | Ootsuka et al. | |
| 2010/0184519 A1 | 7/2010 | Ootsuka et al. | |
| 2010/0272502 A1 * | 10/2010 | Nagayama et al. | 403/2 |

FOREIGN PATENT DOCUMENTS

| | | |
|---|---|---|
| DE | 41 12 484 A1 | 10/1992 |
| JP | 62-159815 A | 7/1987 |
| JP | 7-310753 | 11/1995 |
| WO | WO 2007/114210 A1 | 10/2007 |

* cited by examiner

*Primary Examiner* — Hadi Shakeri
(74) *Attorney, Agent, or Firm* — McGinn IP Law Group, PLLC

(57) ABSTRACT

A shear valve protection member is disposed radially outwards of the shear valves and in the same axial position as the shear valves, which can be switched between a tightly attached state in which the strip-shaped shear valve protection member cannot move relatively to a cutting portion which connects to the other member by virtue of a frictional force generated between the cutting portion and itself by tightly attaching the cutting portion thereto in the radial direction and a tight attachment cancelled state in which the strip-shaped shear valve protection member can move in a circumferential direction relative to the cutting portion. The shear valve protection member can be switched between a position where the shear valves are covered with the shear valve protection member and a position where the shear valves are exposed from the shear valve protection member through the through holes therein.

9 Claims, 5 Drawing Sheets

TORQUE LIMITER

TECHNICAL FIELD

The present invention relates to a torque limiter.

BACKGROUND ART

As a conventional torque limiter, a torque limiter is described in JP-A-62-159815 (Patent Document 1). In this torque limiter, an inner circumferential surface of a cylindrical member is fitted on an outer circumferential surface of a shaft member. Hydraulic oil is supplied into a hydraulic expansion chamber in the cylindrical member. The inner circumferential surface of the cylindrical member is contracted diametrically by the hydraulic oil in the hydraulic expansion chamber so that the inner circumferential surface is pressed against the outer circumferential surface of the shaft member to thereby bring the shaft member and the cylindrical member into frictional connection for transmission of torque. In this torque limiter, a cutting member of the shaft member is locked at the other end portion of a shear valve which communicates with the hydraulic expansion chamber at one end portion thereof.

When the shaft member changes its circumferential position relative to the cylindrical member as a result of the inner circumferential surface of the cylindrical member slipping on the outer circumferential surface of the shaft member due to a load of a predetermined value or larger being exerted on the shaft member or the cylindrical member, the other end portion of the shear valve which constitutes the other end portion of the oil drain is designed to be cut by the cutting member so that the hydraulic oil within the hydraulic expansion chamber is discharged to an exterior portion. By the hydraulic oil being so discharged, the inner circumferential surface of the cylindrical member is no more pressed against the outer circumferential surface of the shaft member, whereby the frictional connection of the shaft member with the cylindrical member is cancelled to cut off the transmission of torque.

The torque limiter has a plurality of scattering prevention covers. Each scattering prevention cover is a cap-shaped member. There are provided the same number of scattering prevention covers as the number of shear valves, and the scattering prevention covers are disposed so as to cover the corresponding shear valves. The cap-shaped members are fixedly screwed to the cylindrical member.

The scattering prevention cover prevents the scattering of oil at the other end portion of the shear valve and within the hydraulic expansion chamber when the other end portion of the sear valve is cut.

With the conventional torque limiter, when the torque limiter is repaired after the shaft member changes its circumferential position relative to the cylindrical member whereby the other end portions of the shear valves are cut, it is inevitable to perform work of removing all the plurality of scattering prevention covers and work of fixedly attaching the plurality of scattering prevention covers again after new shear valves are fitted in the predetermined positions. Consequently, many manhours and much manpower have to be involved to get the torque limiter ready for operation again after the oil within the hydraulic expansion chamber of the torque limiter has been released to the exterior portion, causing a problem that it is difficult to get the torque limiter ready for operation again quickly and smoothly.

RELATED ART DOCUMENTS

Patent Documents

Patent Document 1: JP-A-62-159815

SUMMARY OF THE INVENTION

Problem that the Invention is to Solve

Then, a problem that the invention is to solve is to provide a torque limiter which can get itself ready for operation again quickly and smoothly after oil within a hydraulic expansion chamber of the torque limiter is released to an exterior portion.

Means for Solving the Problem

With a view to solving the problem, according to the invention, there is provided a torque limiter comprising:
 a shaft member;
 a cylindrical member which faces the shaft member in a radial direction of the shaft member;
 a hydraulic expansion chamber for pressing a circumferential surface of one member of the shaft member and the cylindrical member against a circumferential surface of the other member of the shaft member and the cylindrical member, the hydraulic expansion member being provided in either the shaft member or the cylindrical member;
 one or more shear valves which communicate with the hydraulic expansion chamber at one end and project radially outwards of the outer circumferential surface of the one member at the other end; and
 a strip-shaped shear valve protection member which is disposed radially outwards of the shear valves and in the same axial position as the shear valves, which can be switched between a tightly attached state in which the strip-shaped shear valve protection member cannot move relatively to a cutting portion which connects to the other member by virtue of a frictional force generated between the cutting portion and itself by tightly attaching the cutting portion thereto in the radial direction and a tight attachment cancelled state in which the strip-shaped shear valve protection member can move in a circumferential direction relative to the cutting portion and which has one or more through holes which can expose the shear valves therefrom, and characterized in that
 the shear valve protection member can be switched between a position where the shear valves are covered with the shear valve protection member and a position where the shear valves are exposed from the shear valve protection member through the through holes therein.

In the torque limiter of the invention, the shear valve protection member is put in the tightly attached state with other portions of the shear valve protection member than the through holes superposed on the shear valves in the radial direction so that the shear valves are covered with the shear valve protection member, whereby the scattering of oil at the radially outward end portions of the shear valves and within the hydraulic expansion chamber is prevented.

In the torque limiter of the invention, when the other end portions of the shear valves are cut to thereby cancel the transmission of torque, roughly speaking, the shear valves are replaced in the following manner, for example.

Firstly, the shear valve protection member is moved in the circumferential direction after the shear valve protection member has been switched from the tightly attached state to the tight attachment cancelled state. Then, the phase of the trough holes in the shear valve protection member and the phase of shear valve mounting portions lying on the outer circumferential surface of the one member are registered in the circumferential direction. Following this, the shear valve protection member is switched back from the tight attachment cancelled state to the tightly attached state, and thereafter, the replacement of shear valves is effected. Thereafter, the shear valve protection member is switched from the tightly attached state to the tight attachment cancelled state, and the shear valve protection member is moved in the circumferential direction. Finally, in such a state that the phase of the through holes in the shear valve protection member and the phase of the shear valves differ in the circumferential direction whereby the shear valve protection member covers the shear valves, the shear valve protection member is switched back again from the tight attachment cancelled state to the tightly attached state. The replacement of shear valves is effected in the way described above.

According to the invention, since the shear valve protection member can take the tightly attached state in which the shear valve protection member cannot be moved relatively to the other member by tightly attaching the other member thereto in the radial direction, in transmitting the torque of the torque limiter, the shear valves can easily and quickly be covered with the shear valve protection member only by putting the shear valve protection member in the tightly attached state in such a state that the other portions of the shear valve protection member than the through holes are superposed on the shear valves in the radial direction whereby the shear valves are covered with the shear valve protection member. Consequently, the function to prevent the scattering of oil in the shear valves and the hydraulic expansion chamber can easily and quickly be established.

In addition, according to the invention, although done in the conventional example, screwing on and off a number of cap-shaped members which coincides with the number of shear valves does not have to be carried out in replacement of shear valves. As has been described above, the replacement of shear valves can quickly and easily be effected only by performing the work of switching the state of the shear valve protection member between the tightly attached state and the tight attachment cancelled state and the work of moving the shear valve protection member in the circumferential direction.

In addition, in the embodiment, the torque limiter includes a plurality of shear valves like the shear valve and the shear valve protection member which has a plurality of through holes like the through hole and the plurality of shear valves are disposed in substantially the same position with respect to an axial direction of the one member and are disposed at intervals so as to be spaced apart from each other in a circumferential direction of the one member, and in that when viewed from a radially outer side of the one member, with one of the plurality of shear valves positioned within one of the plurality of through holes, the other shear valves are positioned within the other through holes.

According to the embodiment, the torque limiter comprises the plurality of shear valves, and the shear valve protection member has the plurality of through holes. When viewed from the radially outer side of the one member, since with one of the plurality of shear valves positioned in one of the plurality of through holes, the other shear valves are positioned within the other through holes, the replacement of the plurality of shear valves can be effected by performing totally the same operations as the aforesaid series of operations of the shear valve protection member. Consequently, the replacement of shear valves can be effected much more easily and quickly than the conventional torque limiter in consideration of the fact that in the conventional method, in the case of there being provided a plurality of cap-shaped members, the manpower required for work of screwing on and off the plurality of cap-shaped members becomes a plurality of times more than the embodiment of the invention.

In the embodiment, the torque limiter is characterized in that the shear valve protection member is an annular member, and in that the shear valve protection member has an operating portion which switches the state of the shear valve protection member between the tightly attached state and the tight attachment cancelled state by causing an inside diameter of the shear valve protection member to change while retaining an annular shape.

According to the embodiment, since the shear valve protection member has the operating portion which switches the state of the shear valve protection member between the tightly attached state and the tight attachment cancelled state by causing the inside diameter of the shear valve protection member to change while retaining an annular shape, there is caused no such situation that the shear valve protection member is made into a non-annular member having ends in switching the state of the shear valve protection member from the tightly attached state to the tight attachment cancelled state. Consequently, when switching the state of the shear valve protection member from the tight attachment cancelled state to the tightly attached state, no such difficult work is involved to wind the member having ends around an outer circumferential surface of the annular member. Then, the shear valve protection member can easily and quickly be switched from the tight attachment cancelled state to the tightly attached state by changing the diameter of the annular shear valve protection member by the operating portion. In addition, in the case of a large torque limiter in particular, the state of the shear valve protection member can be switched from the tight attachment cancelled state to the tightly attached state much more quickly and easily.

In the embodiment, the torque limiter is characterized in that the shear valve protection member comprises:

a strip-shaped main body portion having the one or more through holes; and one or more gripping portions which project radially outwards of an outer circumferential surface of the main body portion from the outer circumferential surface, and in that the gripping portions are positioned at intervals in a circumferential direction for the operating portion and each of the one or more through holes.

According to the embodiment, since the shear valve protection member comprise the strip-shaped main body portion having the one or more through holes and the one or more gripping portions which project radially outwards from the outer circumferential surface of the main body portion, force can be applied to the gripping portions by gripping on the gripping portions. Consequently the shear valve protection member can easily be moved in the circumferential direction by applying the force to the gripping portions.

Advantage of the Invention

According to the torque limiter of the invention, in transmitting the torque of the torque limiter, the shear valves can easily and quickly be covered with the shear valve protection member only by switching the shear valve protection member to the tightly attached state in such a state that the other portions of the shear valve protection member than the through holes are superposed on the shear valves in the radial direction whereby the shear valves are covered with the shear valve protection member. Consequently, the scattering preventing function of the shear valves can easily and quickly be established.

In addition, according to the invention, although done in the conventional example, in replacement of shear valves, screwing on and off a number of cap-shaped members which coincides with the number of shear valves does not have to be carried out. The replacement of shear valves can quickly and easily be effected only by performing the work of switching the state of the shear valve protection member between the tightly attached state and the tight attachment cancelled state and the work of moving the shear valve protection member in the circumferential direction.

In addition, according to the torque limiter of the invention, the maintenance or repair of the shear valves can easily and quickly be carried out.

MODE FOR CARRYING OUT THE INVENTION

Figure 1:
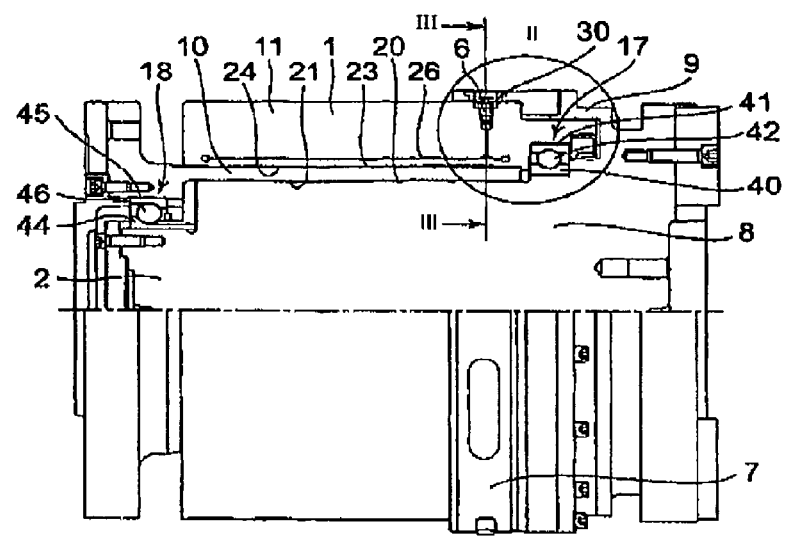
FIG. 1 An axial exemplary view of a torque limiter of a first embodiment of the invention.

Hereinafter, the invention will be described in detail based on an embodiment shown in the drawings.

FIG. 1 is an axial exemplary view of a torque limiter of a first embodiment of the invention. In FIG. 1, an upper half portion shows an axial sectional view and a lower half portion shows a perspective view of the torque limiter.

This torque limiter includes a cylindrical member 1, a shaft member 2, four shear valves 6, a shear valve protection member 7, a ball bearing 17 and a ball bearing 18.

The cylindrical member 1 is made up of a first cylindrical member 10 and a second cylindrical member 11. The first cylindrical member 10 has a substantially cylindrical inner circumferential surface 21 which is brought into abutment with an outer circumferential surface 20 of the shaft member 2. A seizing prevention lubricant (traction oil or turbine oil) is present between the outer circumferential surface 20 of the shaft member 2 and the inner circumferential surface 21 of the first cylindrical member 10. The second cylindrical member 11 has a substantially cylindrical inner circumferential surface 24 which his brought into abutment with a substantially cylindrical outer circumferential surface 23 of the first cylindrical member 10. The second cylindrical member 11 has four shear valve mounting holes 30 and an annular hydraulic expansion chamber 26.

The hydraulic expansion chamber 26 extends substantially in an axial direction of the shaft member 2 over a predetermined axial length of the inner circumferential surface 24 of the second cylindrical member 11. The four shear valve mounting holes 30 are positioned at equal intervals in a circumferential direction on the outer circumferential surface of the second cylindrical member 11. The number of shear valves 6 provided coincides with the number of shear valve mounting holes 30. Each shear valve 6 is fitted in the shear valve mounting hole 30 so as to be fixed therein.

Figure 2:
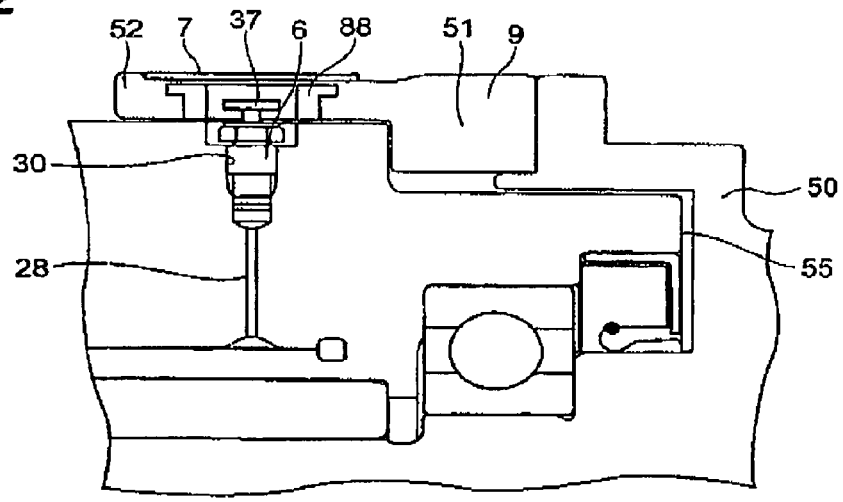
FIG. 2 An enlarged sectional view of the periphery of a shear valve in FIG. 1 at II.

FIG. 2 is an enlarged sectional view of a peripheral portion of the sear valve 6 shown in FIG. 1, which peripheral portion is indicated by reference character II in FIG. 1.

As is shown in FIG. 2, the second cylindrical member 11 has an oil drain hole 28. A radially inward end of the oil drain hole 28 communicates with the hydraulic expansion chamber 26, while the other radially outward end of the oil drain hole 28 opens to the shear valve mounting hole 30.

Each shear valve 6 has a tube (a passageway) in an interior thereof. The tube extends substantially radially of the shaft member 2 with the shear valve 6 fitted in the shear valve mounting hole 30. As is shown in FIG. 2, a radially outer end portion of the shear valve 6 constitutes a T-shaped head portion 37. With the shear valve 6 fitted in the shear valve mounting hole 30, the head portion 37 projects further radially outwards than the outer circumferential surface of the second cylindrical member 11.

With the shear valve 6 fitted in the shear valve mounting hole 30, a radially inward end portion of the tube communicates with the other end of the oil drain hole 28 and then communicates with an axial end of the hydraulic expansion chamber 26. In addition, with the shear valve 6 fitted in the shear valve mounting hole 30, the other radially outward end portion of the tube extends as far as the head portion 37 and projects further radially outwards than the outer circumferential surface of the second cylindrical member 11. The other radially outward end portion of the tube is sealed.

As is shown in FIGS. 1 and 2, a cutting portion 9 is connected to a main body portion 8 of the shaft member 2 which has the substantially cylindrical outer circumferential surface 20. The cutting portion 9 is fixed to the main body portion 8. The cutting portion 9 has a substantially L-shaped section and projects from the outer circumferential surface of the main body portion 8.

As is shown in FIG. 2, the cutting portion 9 has a radially extending portion 50, an axially extending portion 51 and a circumferentially extending portion (shear cover) 52. The radially extending portion 50 faces axially an axial end face 55 of the cylindrical member 1 and extends radially. The axially extending portion 51 is connected to the radially extending portion 50. The axially extending portion 51 extends axially along an outer circumferential surface of the cylindrical member 1.

The ball bearing 17 has an inner ring 40 which is fitted on the outer circumferential surface of the shaft member 2 to thereby be fixed thereto, an outer ring 41 which is fitted in the inner circumferential surface of the second cylindrical member 11 to thereby be fixed thereto, and a plurality of balls 42 which are disposed between a raceway surface of the inner ring 40 and a raceway surface of the outer ring 41. In addition, the ball bearing 18 has an inner ring 44 which is fitted on the outer circumferential surface of the shaft member 2 to thereby be fixed thereto, an outer ring 45 which is fitted in the inner circumferential surface of the first cylindrical member 10 to thereby be fixed thereto, and a plurality of balls 46 which are disposed between a raceway surface of the inner ring 44 and a raceway surface of the outer ring 45. The ball bearings 17, 18 support rotatably the shaft member 2 relative to the cylindrical member 1 when the shaft member 2 is rotating relatively to the cylindrical member 1.

Figure 3:
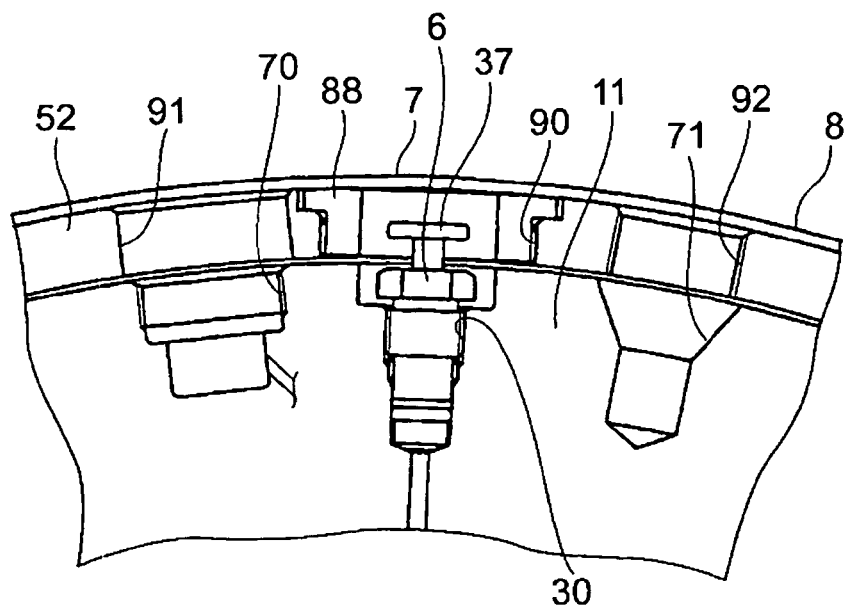
FIG. 3 An enlarged sectional view of a peripheral portion of a shear valve mounting hole which is taken along the line III-III in FIG. 1.

FIG. 3 is an enlarged sectional view of a peripheral portion of the shear valve mounting hole 30 which is taken along the line III-III in FIG. 1.

As is shown in FIG. 3, an axial position of the circumferentially extending portion 52 of the cutting member 9 substantially coincides with an axial position of the shear valve 6. The circumferentially extending portion 52 extends in the circumferential direction of the cylindrical member 1.

The circumferentially extending portion 52 has a shear valve insertion hole 90, a coupler insertion hole 91 and a pin insertion hole 92. The shear valve insertion hole 90, the coupler insertion hole 91 and the pin insertion hole 92 are laid adjacent to each other in the circumferential direction of the circumferentially extending portion 52. In addition, as is shown in FIG. 3, the second cylindrical member 11 has a greasing port 70 and a positioning hole 71.

As is shown in FIG. 3, the head portion 37 is positioned in the shear valve insertion hole 90. With a circumferential phase of the positioning hole 71 coinciding with a circumferential phase of the pin insertion hole 92, a pin is inserted through the pin insertion hole 92 into the positioning hole 71, whereby the generation of a circumferential phase registration error between the second cylindrical member 11 and the circumferentially extending portion 52 is prevented.

In addition, with the generation of phase registration error between the second cylindrical member 11 and the circumferentially extending portion 52 prevented, a circumferential phase of the coupler insertion hole 91 is registered with a circumferential phase of the greasing port 70, and a circumferential phase of the shear valve insertion hole 90 is registered with a circumferential phase of the shear valve mounting hole 30.

The shear valve protection member 7 is an annular member and has a strip-shaped main body portion formed of metal or rubber and an operating portion (which will be described later). As is shown in FIGS. 2 and 3, the shear valve protection member 7 extends circumferentially on an outer circumferential surface of the circumferentially extending portion 52. As is shown in FIG. 3, the shear valve protection member 7 is disposed radially outwards of the shear valve 6 and in the same axial position as the shear valve 6.

In FIGS. 2 and 3, reference numeral 88 denotes an annular threaded member which is interposed between the shear valve 6 and the shear valve insertion hole 90. This threaded member 88 functions to fix the shear valve 6 in the shear valve insertion hole 90 in a stable fashion.

Figure 4:
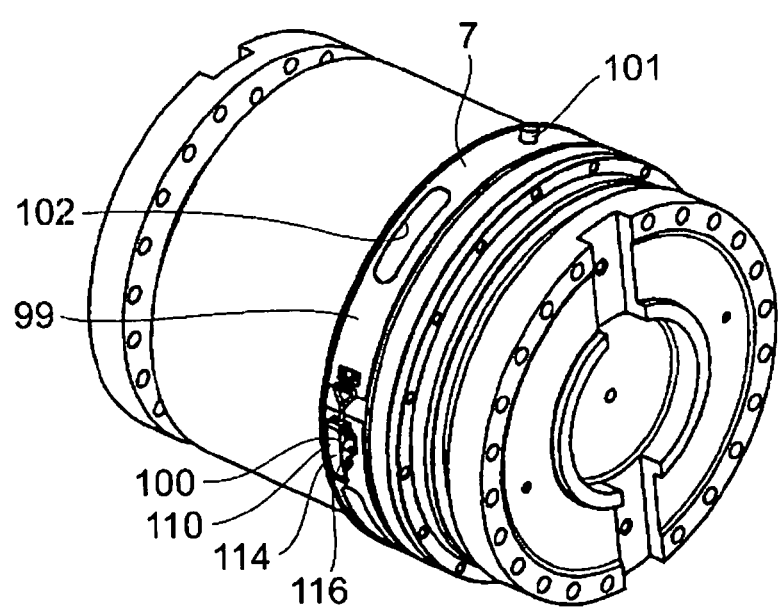
FIG. 4 A perspective view of part of the torque limiter which is in the midst of performing an oil scattering preventing action on the shear valve.

FIG. 4 is a perspective view showing part of the torque limiter which is in midst of performing an oil scattering preventing action on the shear valve.

As is shown in FIG. 4, the shear valve protection member 7 has the strip-shaped main body portion 99 having ends, the operating portion 100, three gripping portions 101 and four through holes 102. The four through holes 102 are formed in the main body portion 99 and are disposed at intervals in the circumferential direction.

Figure 5:
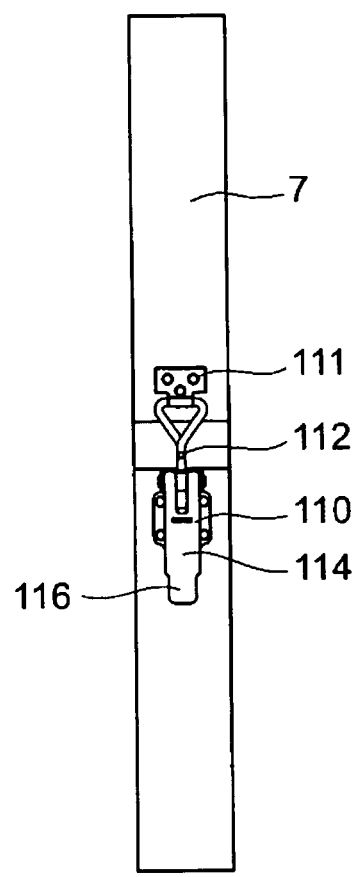
FIG. 5 A plan view showing the construction of an operating portion of a shear valve prevention member.

FIG. 5 is a plan view showing the construction of the operating portion 100.

As is shown in FIG. 5, the operating portion 100 has a diameter adjusting portion 110, a metallic connecting device fastener 111 and a metallic connecting device 112. The diameter adjusting portion 110 is fixed to one end portion of the main body portion 99, and the metallic connecting device fastener 111 is fixed to the other end portion of the main body portion 99. In addition, one end of the metallic connecting device 112 is fixed to a knob 114 of the diameter adjusting portion 110, and the other end of the metallic connecting device 112 is fixed to the metallic connecting device fastener 111. The main body portion 99 having ends and the operating portion 100 of the shear valve protection member 7 make up an annular member.

Referring to FIGS. 4 and 5, the operating portion 100 has a construction which is similar to fasteners of a pair of braces for holding up trousers.

Namely, in the operating portion 100, a distal end portion 116 of the knob 114 of the diameter adjusting portion 110 is moved so as to be erected in the direction of a normal to an outer circumferential surface of the main body portion 99 so that a space between one end and the other end of the strip-shaped main body portion 99 can be expanded, thereby making it possible to increase the diameter of the shear valve protection member 7. Hereinafter, a state in which with the knob 114 erected, the diameter of the shear valve protection member is larger than a smallest diameter of the shear valve protection member 7 is referred to as a tight attachment cancelled state.

In addition, the diameter of the shear valve protection member 7 is made smallest by causing the knob 114 to lie flat so that the distal end portion 116 of the knob 114 is brought into contact with the main body portion 99. Hereinafter, a state in which with the knob 114 laid flat, the diameter of the shear valve protection member 7 is smallest is referred to as a tightly attached state. The smallest diameter of the shear valve protection member 7 is made slightly smaller than an outside diameter of an outer circumferential surface o the circumferentially extending portion 52. Namely, in the tightly attached state, an inner circumferential surface of the shear valve protection member 7 has a slight interference relative to the outer circumferential surface of the circumferentially extending portion 52.

According to this configuration, with the knob 114 caused to lie flat, the main body portion 99 is allowed to be locked on the outer circumferential surface of the circumferentially extending portion 52 through friction, whereby the main body portion 99 is prevented from moving relatively to the outer circumferential surface of the circumferentially extending portion 52.

In this way, in the shear valve protection member 7, an inside diameter of the main body portion 99 can be changed by causing the knob 114 to be erected or to lie flat.

Figure 6:
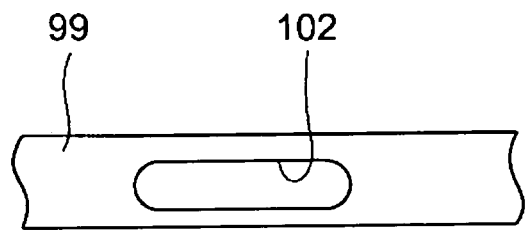
FIG. 6 A plan view showing the shape of a through hole in the shear valve protection member.

FIG. 6 is a plan view showing the shape of a through hole 102 in the shear valve protection member 7. In addition, FIG. 7 is a plan view resulting when the shear valve protection member 7 is seen from an outside of the torque limiter shown in FIG. 4 in an axial direction.

As is shown in FIGS. 4 and 6, each through hole 102 has an elongated hole shape. In FIG. 7, four through holes 102 are present in positions indicated by reference characters a, b, c and d. Namely, with the knob 114 being in contact with the main body portion 99 (with the diameter of the shear valve protection member 7 being smallest), the four through holes 102 are positioned so as to be spaced π/4 radian apart from one another.

Figure 7:
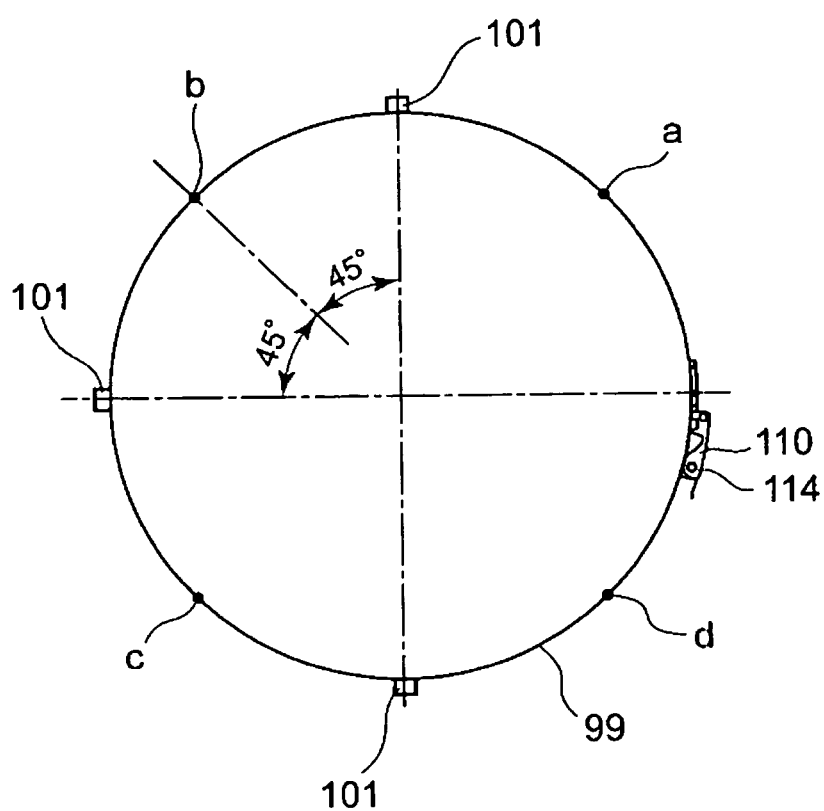
FIG. 7 A plan view resulting when the shear valve protection member is seen from an outside of the torque limiter shown in FIG. 4 in an axial direction.

In addition, as is shown in FIGS. 4 and 7, the gripping portions 101 project radially outwards from the outer circumferential surface of the main body portion 99. As is shown in FIG. 7, the three gripping portions 101 and the operating portion 100 are positioned so as to be spaced π/4 radian apart from one another with the diameter of the shear valve protection member 7 being smallest.

Figure 8:
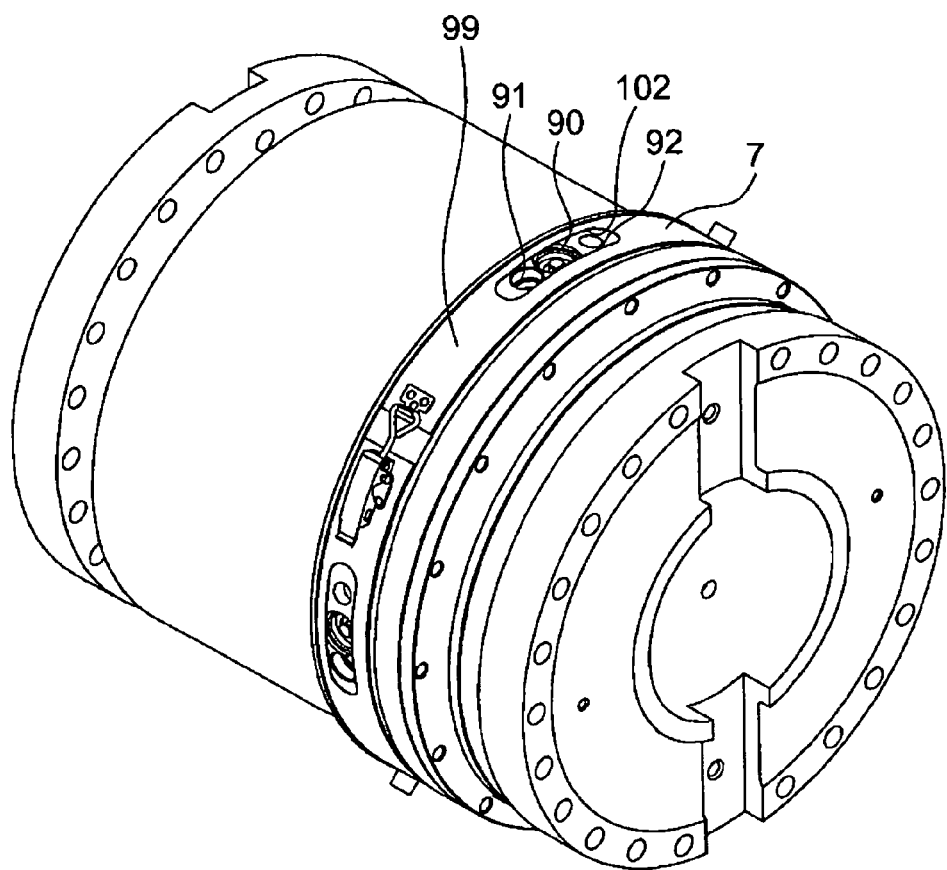
FIG. 8 A perspective view showing part of the torque limiter which is in the midst of replacing shear valves.

FIG. 8 is a perspective view showing part of the torque limiter which is in midst of replacing (mounting, removing) shear valves. In FIG. 8, the shear valve protection member 7 is positioned in a shear valve replacement position and is locked on the outer circumferential surface of the circumferentially extending portion 52.

As is shown in FIG. 8, in the shear valve replacement position, a circumferential phase of the through holes 102 in the shear valve protection member 7 and a circumferential phase of an insertion hole area including the three insertion holes, that is, a circumferential insertion hole area including the shear valve insertion hole 90, the coupler insertion hole 91 and the pin insertion hole 92 (refer to FIG. 3) coincide with each other.

As is shown in FIG. 8, in such a state that the insertion hole area is positioned within one through hole 102 of the shear valve protection member 7 when seen from a radially outer side of the cylindrical member 1 (or the shaft member 2), the other insertion hole areas are positioned in the other through holes 102 of the shear valve protection member 7.

In the configuration described above, in the case of a load of a predetermined value or less (a load falling within a range where the transmission of torque is effected) being exerted on the shaft member 2 or the cylindrical member, the inner circumferential surface 21 of the first cylindrical member 10 is diametrically contracted by hydraulic pressure increasing oil poured into the hydraulic expansion chamber by couplers (not shown) so as to press the inner circumferential surface 21 against the outer circumferential surface 20 of the shaft member 2, whereby the shaft member 2 and the cylindrical member 1 are brought into frictional connection for transmitting torque between the shaft member 2 and the cylindrical member 1.

On the other hand, in the case of a load of the predetermined value or more (a load larger than the range where the transmission of torque is effected) being exerted on the shaft member 2 or the cylindrical member 1 to cause the outer circumferential surface 20 of the shaft member 2 to slip on the inner circumferential surface 21 of the first cylindrical member 10 whereby the circumferential positions of the shaft member 2 and the cylindrical member 1 change, the cutting portions 9 cut the head portions 37 of the shear valves 6 so that the hydraulic pressure increasing oil within the hydraulic expansion chamber 26 is discharged to the outside of the torque limiter via the tubes of the shear valves 6 of which the other ends are cut. In this way, the pressure exerted by the inner circumferential surface 21 of the first cylindrical member 10 on the outer circumferential surface 20 of the shaft member 2 is released so as to cancel the frictional connection of the shaft member 2 with the cylindrical member 1 whereby the transmission of torque is cut off. In this way, in the event of the excessive load being generated in the shaft member 2 or the cylindrical member 1, the transmission of torque is cut off so as to protect an expensive machine connected to the torque limiter device.

In addition, in the torque limiter, the scattering of oil within the shear valves 6 and the hydraulic expansion chamber 26 is prevented in the following manner.

Namely, in this torque limiter, as is shown in FIG. 4, in such a state that the other portions of the shear valve protection member 7 than the through holes 102 are superposed on the shear valves 6 in the radial direction so that the shear valves 6 are covered with the shear valve protection member 7, the shear valve protection member 7 is switched to the tightly attached state so as to prevent the scattering of oil within the shear valves 6 and the scattering of oil within the hydraulic expansion chamber 26.

Further, in this torque limiter, in the event that the transmission of torque is cut off, that is, in the event that the shear valves 6 fail, the replacement of shear valves 6 and refilling of oil into the hydraulic expansion chamber 26 are effected in the following manner.

Firstly, in the shear valve protection member 7, the shear valve protection member 7 is moved in the circumferential direction after the knob 114 of the operating portion 100 is erected and the tightly attached state is switched to the tight attachment cancelled state. Then, the phase of the through hole 102 in the shear valve protection member 7 and the phase of the shear valve insertion hole 90, the coupler insertion hole 91 and the pin insertion hole 92 are registered in the circumferential direction. Thereafter, the shear valve protection member 7 is switched back from the tight attachment cancelled state to the tightly attached state, and as is shown in FIG. 8, the shear valve protection member 7 is fixed to the outer circumferential surface of the circumferentially extending portion in a maintenance position with a slight interference.

Thereafter, referring to FIG. 3, in such a state that the circumferential phase of the positioning hole 71 coincides with the circumferential phase of the pin insertion hole 92, a pin is inserted through the pin insertion hole 92 into the positioning hole 71 so that no phase registration error is generated between the first cylindrical member 11 and the circumferentially extending portion 52 and the phase of the shear valve insertion hole 90 and the phase of the shear valve mounting hole 30 are caused to coincide with each other, and the phase of the coupler insertion hole 91 and the phase of the greasing port 70 are caused to coincide with each other.

Thereafter, the four used shear valves 6 of which the head portions 37 are ruptured are replaced with new shear valves 6 of which head portions 37 are sealed, whereafter couplers are inserted through the coupler insertion holes 91 into the greasing ports 70 so that a predetermined amount of oil is poured into the hydraulic expansion chamber 26 to be sealed therein.

Thereafter, the shear valve protection member 7 is switched from the tightly attached state to the tight attachment cancelled state so that the shear valve protection member 7 is moved in the circumferential direction.

Finally, in such a state that the phase of the through holes 102 in the shear valve protection member 7 differs from the phase of the shear valves 6 in the circumferential direction whereby the shear valve protection member 7 covers the shear valves 6, the shear valve protection member 7 is switched back from the tight attachment cancelled state to the tightly attached state so that the shear valve protection member 7 is fixed on to the outer circumferential surface of the circumferentially extending portion 52 in a predetermined position when the torque limiter is used. In this way, the replacement of shear valves 6 and refilling of oil into the hydraulic expansion chamber 26 are effected.

According to the torque limiter of the embodiment, since the shear valve protection member 7 can take the tightly attached state in which the shear valve protection member 7 cannot be moved relatively to the circumferentially extending portion 52 of the shaft member 2 by tightly attaching the circumferentially extending portion 52 thereto in the radial direction, in transmitting the torque of the torque limiter, the shear valves 6 can easily and quickly be covered with the shear valve protection member 7 only by putting the shear valve protection member 7 in the tightly attached state in such a state that the other portions of the shear valve protection member 7 than the through holes 102 are superposed on the shear valves 6 in the radial direction whereby the shear valves 6 are covered with the shear valve protection member 7. Consequently, the function to prevent the scattering of oil in the shear valves 6 can easily and quickly be established.

In addition, according to the torque limiter of the embodiment, although done in the conventional example, screwing on and off a number of cap-shaped members which coincides with the number of shear valves does not have to be carried out in replacement of shear valves. As has been described above, the replacement of shear valves 6 can quickly and easily be effected only by performing the work of switching the state of the shear valve protection member 7 between the tightly attached state and the tight attachment cancelled state and the work of moving the shear valve protection member 7 in the circumferential direction.

According to the torque limiter of the embodiment, the torque limiter includes the four shear valves 6, and the shear valve protection member 7 has the four through holes 102. When viewed from the radially outer side of the cylindrical member 1, since with one of the four shear valves 6 positioned in one of the four through holes 102, the other shear valves 6 are positioned within the other through holes 102, the replacement of the four shear valves 6 can be effected by performing totally the same operations as a series of operations of the shear valve protection member 7 which is performed in the case of there being provided only one shear valve 6. Consequently, the replacement of shear valves can be effected much more easily and quickly than the conventional torque limiter in consideration of the fact that in the conventional method, in the case of there being provided a plurality of cap-shaped members, the manpower required for work of screwing on and off the plurality of cap-shaped members becomes a plurality of times more than the torque limiter of the embodiment.

According to the torque limiter of the embodiment, since the shear valve protection member 7 has the operating portion 100 which switches the state of the shear valve protection member 7 between the tightly attached state and the tight attachment cancelled state while retaining an annular shape, there is caused no such situation that the shear valve protection member 7 is made into a non-annular member having ends in switching the state of the shear valve protection member 7 from the tightly attached state to the tight attachment cancelled state. Consequently, when switching the state of the shear valve protection member 7 from the tight attachment cancelled state to the tightly attached state, no such difficult work is involved to wind the member having ends around an outer circumferential surface of the annular member. Then, the shear valve protection member 7 can easily and quickly be switched from the tight attachment cancelled state to the tightly attached state by changing the diameter of the annular shear valve protection member 7 by the operating portion 100. In particular, in the case of a large torque limiter, the state of the shear valve protection member 7 can be switched from the tight attachment cancelled state to the tightly attached state much more quickly and easily.

According to the torque limiter of the embodiment, since the shear valve protection member 7 includes the strip-shaped main body portion 99 having the plurality of through holes 102 and the plurality of gripping portions 101 which project radially outwards from the outer circumferential surface of the main body portion 99, force can be applied to the gripping portions by gripping on the gripping portions 101. Consequently the shear valve protection member 7 can easily be moved in the circumferential direction by applying the force to the gripping portions 101.

In the torque limiter of the embodiment, while the annular hydraulic expansion chamber 26 is formed in the cylindrical member 1, in this invention, an annular hydraulic expansion chamber 26 may be formed in the shaft member so that the hydraulic expansion chamber is expanded by the pressure of oil so as to press the outer circumferential surface of the shaft member against the inner circumferential surface of the cylindrical member. As this occurs, in FIG. 1, for example, a passage which communicates with the hydraulic expansion chamber and extends in the radial direction may be formed on a right-hand side of the ball bearing 17, and shear valve mounting holes may be formed a portion of the outer circumferential surface of the shaft member which lies on the right-hand side of the ball bearing 17 so as to communicate with the passage. In this way, in the case of the shaft member having the outer circumferential surface which is exposed to the outside, the hydraulic expansion chamber can be formed in the shaft member.

In the torque limiter of the embodiment, while the number of gripping portions is three, in this invention, no gripping portion may be present or the number of gripping portions may be any natural number other than three. In this invention, a plurality of gripping portions may be formed at equal intervals on the outer circumferential surface of the shear valve protection member. Alternatively, a plurality of gripping portions may be formed at unequal intervals on the outer circumferential surface of the shear valve protection member.

In the torque limiter of the embodiment, while the shear valve mounting holes 30, the shear valves 6 and the through holes 102 in the shear valve protection member 7 are present four each, in this invention, the numbers of shear valve mounting holes and shear valves may be any natural numbers other than four. In addition, the number of through holes in the shear valve protection member may be any natural number other than four. The number of through holes in the shear valve protection member may be any number which is larger than the number of shear valve mounting holes.

In the torque limiter of the embodiment, while the adjustment of the diameter of the shear valve protection member 7 is effected by erecting or laying flat the distal end portion 116 of the knob 114 of the operating portion 100, in this invention, the adjustment of the diameter of the shear valve protection member may be effected by the same construction as the construction of a commercially available belt which has a strip-like shape having a buckle and a plurality of holes, for example. In this invention, the adjustment of the diameter of the shear valve protection member may be effected by the same construction as the construction of a commercially available belt which has a strip-like shape having no buckle and holes. In this invention, a configuration may be adopted in which the shear valve protection member becomes a non-annular member having ends in the tight attachment cancelled state.

The invention claimed is:

1. A torque limiter comprising:
a shaft member;
a cylindrical member which faces the shaft member in a radial direction of the shaft member;
a hydraulic expansion chamber for pressing a circumferential surface of one member of the shaft member and the cylindrical member against a circumferential surface of the other member of the shaft member and the cylindrical member, the hydraulic expansion member being provided in either the shaft member or the cylindrical member;
one or more shear valves which communicate with the hydraulic expansion chamber at one end and project radially outwards of the outer circumferential surface of the one member at the other end; and a strip-shaped shear valve protection member which is disposed radially outwards of the shear valves and in the same axial position as the shear valves, which can be switched between a tightly attached state in which the strip-shaped shear valve protection member cannot move relatively to a cutting portion which connects to the other member by virtue of a frictional force generated between the cutting portion and itself by tightly attaching the cutting portion thereto in the radial direction and a tight attachment cancelled state in which the strip-shaped shear valve protection member can move in a circumferential direction relative to the cutting portion and which has one or more through holes which can expose the shear valves therefrom, wherein the shear valve protection member can be switched between a position where the shear valves are covered with the shear valve protection member and a position where the shear valves are exposed from the shear valve protection member through the through holes therein, and wherein the shear valve protection member comprises an annular member.

2. A torque limiter as set forth in claim 1, wherein the one or more shear valves comprises a plurality of shear valves and said one or more through holes of the shear valve protection member comprises a plurality of through holes and wherein the plurality of shear valves are disposed in substantially the same position with respect to an axial direction of the one member and are disposed at intervals so as to be spaced apart from, each other in a circumferential direction of the one member, and when viewed from a radially outer side of the one member, with one of the plurality of shear valves positioned within one of the plurality of through holes, the other shear valves are positioned within the other through holes.

3. A torque limiter as set forth in claim 2, wherein the shear valve protection member comprises an operating portion which switches the state of the shear valve protection member between the tightly attached state and the tight attachment cancelled state by causing an inside diameter of the shear valve protection member to change while retaining an annular shape.

4. A torque limiter as set forth in claim 1, wherein the shear valve protection member comprises an operating portion which switches the state of the shear valve protection member between the tightly attached state and the tight attachment cancelled state by causing an inside diameter of the shear valve protection member to change while retaining an annular shape.

5. A torque limiter as set forth in claim 4, wherein the shear valve protection member comprises:

a strip-shaped main body portion having the one or more through holes; and one or more gripping portions which project radially outwards of an outer circumferential surface of the main body portion from the outer circumferential surface, and the gripping portions are positioned at intervals in a circumferential direction for the operating portion and each of the one or more through holes.

6. A torque limiter as set forth in claim 1, wherein the plurality of through holes are disposed around a circumference of the shear valve protection member.

7. A torque limiter as set forth in claim 1, wherein the through hole has a length in a circumferential direction greater than a width in an axial direction.

8. A torque limiter as set forth in claim 1, wherein the through holes are spaced an equal distance from one another, in the circumferential direction, when the shear valve protection member is in the tightly attached state.

9. A torque limiter comprising:

a shaft member;

a cylindrical member which faces the shaft member in a radial direction of the shaft member;

a hydraulic expansion chamber for pressing a circumferential surface of one member of the shaft member and the cylindrical member against a circumferential surface of another member of the shaft member and the cylindrical member, the hydraulic expansion member being provided in either the shaft member or the cylindrical member;

one or more shear valves which communicate with the hydraulic expansion chamber at one end and project radially outwards of the outer circumferential surface of the one member at another end; and a strip-shaped shear valve protection member which is disposed radially outwards of the shear valves and in a same axial position as the shear valves, which can be switched between an attached state in which the strip-shaped shear valve protection member cannot move relatively to a cutting portion which connects to another member by virtue of a frictional force generated between the cutting portion and itself by attaching the cutting portion thereto in the radial direction and an attachment cancelled state in which the strip-shaped shear valve protection member can move in a circumferential direction relative to the cutting portion and which has one or more through holes which can expose the shear valves therefrom, wherein the shear valve protection member can be switched between a position where the shear valves are covered with the shear valve protection member and a position where the shear valves are exposed from the shear valve protection member through the through holes therein, and wherein the shear valve protection member comprises an operating portion which switches a state of the shear valve protection member between the attached state and the attachment cancelled state by causing an inside diameter of the shear valve protection member to change.

* * * * *